(12) United States Patent
Kobres

(10) Patent No.: US 10,331,458 B2
(45) Date of Patent: Jun. 25, 2019

(54) TECHNIQUES FOR COMPUTER SYSTEM RECOVERY

(71) Applicant: NCR Corporation, Duluth, GA (US)

(72) Inventor: Erick C. Kobres, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 4 days.

(21) Appl. No.: 14/973,839

(22) Filed: Dec. 18, 2015

(65) Prior Publication Data

US 2016/0202995 A1 Jul. 14, 2016

Related U.S. Application Data

(62) Division of application No. 14/090,940, filed on Nov. 26, 2013, now Pat. No. 9,250,923.

(51) Int. Cl.
*G06F 17/30* (2006.01)
*G06F 9/4401* (2018.01)
*G06F 11/14* (2006.01)

(52) U.S. Cl.
CPC ............ *G06F 9/441* (2013.01); *G06F 9/4416* (2013.01); *G06F 11/1417* (2013.01); *G06F 11/1451* (2013.01); *G06F 11/1464* (2013.01); *G06F 11/1469* (2013.01); *G06F 2201/805* (2013.01); *G06F 2201/84* (2013.01)

(58) Field of Classification Search
CPC ...................................................... G06F 17/30
USPC ........................................................ 707/609
See application file for complete search history.

(56) References Cited

U.S. PATENT DOCUMENTS

| 5,134,580 | A | * | 7/1992 | Bertram | G06F 9/441 |
| | | | | | 713/1 |
| 5,261,104 | A | * | 11/1993 | Bertram | G06F 9/4401 |
| | | | | | 713/1 |
| 7,724,650 | B2 | * | 5/2010 | Karam | H04L 1/22 |
| | | | | | 340/425.2 |
| 7,725,940 | B2 | * | 5/2010 | Kobayashi | G06F 21/564 |
| | | | | | 707/655 |
| 7,849,351 | B2 | * | 12/2010 | Karam | H04L 1/22 |
| | | | | | 714/4.1 |
| 8,185,961 | B2 | * | 5/2012 | Ichikawa | G06F 21/575 |
| | | | | | 707/821 |

(Continued)

*Primary Examiner* — Kim T Nguyen
(74) *Attorney, Agent, or Firm* — Schwegman, Lundberg & Woessner

(57) ABSTRACT

Techniques for computer system recovery which remotely restore a default partition to a recent state even when an operating system is functioning abnormally. In an example embodiment, a service center computer establishes a first network connection to a monitored computer system. The service center computer configures the monitored computer system to boot from a bootable image file in the monitored computer system and reboots the monitored computer system into an alternate operating system environment of the bootable image file. The service center computer establishes a second network connection to the monitored computer system to restore a recent backup image of the default partition from a diagnostic partition to a default partition. The service center computer establishes a third network connection to the monitored computer system and reboots the monitored computer system to the default partition.

8 Claims, 3 Drawing Sheets

(56) References Cited

U.S. PATENT DOCUMENTS

| | | | | |
|---|---|---|---|---|
| 8,504,693 B2* | 8/2013 | Khosravi | ............... | G06F 8/60 |
| | | | | 709/227 |
| 9,747,094 B2* | 8/2017 | Shroni | ............... | G06F 8/654 |
| 2006/0069902 A1* | 3/2006 | Rui | ............... | G06F 9/441 |
| | | | | 713/1 |

* cited by examiner

TECHNIQUES FOR COMPUTER SYSTEM RECOVERY

CROSS-REFERENCE TO RELATED APPLICATION

The present application is a divisional application and claims the benefit of the filing date of application Ser. No. 14/090,490, filed Nov. 26, 2013, entitled, "TECHNIQUES FOR COMPUTER SYSTEM RECOVERY". The present application is also related to co-pending divisional application Ser. No. 14/973,924.

BACKGROUND

The present invention relates to computer systems, and more specifically to techniques for computer system recovery.

Some computer systems today are sold with storage drives, such as hard drive and solid state drives, containing at least two primary partitions. The first primary partition typically contains an operating system, application programs, and user data. During normal operation, the first primary partition is the active, default, or "boot" partition. The state of the first primary partition at the time the computer is sold is sometimes referred to as the "out-of-box" state.

The second primary partition is sometimes referred to as a "recovery partition" and contains a recovery image of the out-of-box state. A user may decide to return the first primary partition to the out-of-box state when problems cannot be fixed, if the storage drive is still functional, by booting to the second primary partition and applying the recovery image to the first primary partition.

However recovery images are of little value if the storage drive fails. Further, restoring the first primary partition to the out-of-box state results in loss of any user data stored in the first primary partition.

Thus, users may perform regular backup procedures on their storage drives. These backup procedures may include backing up the user data, the primary partition, or the entire storage drive. For example, users may create and store drive images in other local storage drives, external storage drives, network storage drives, or in storage media, such as digital video discs, where the drive images will be available when the storage drive fails.

When the computer system fails to boot up, a user may attempt to apply a recently created backup image from a backup storage drive or from backup storage media to the storage drive. Alternatively, or in addition, the user may replace the storage drive with a new storage drive, and then apply the recently created backup image to the new storage drive.

When many computer systems are managed under a service contract by a service organization, reimaging and/or replacing storage drives may be the quickest and most apparent way to fix problems, but it can be expensive for the service organization. Sending service technicians on-site to repair computer systems is a large part of the cost. Service organizations incur additional costs when the service technicians replace storage drives that are still functional.

Therefore, it would be desirable to provide an improved method of computer system recovery.

SUMMARY

In accordance with the teachings of the present invention, techniques for computer system recovery are provided. An example method includes connecting to a first computer system including a first storage area with a default operating system environment and a second storage area containing a backup image of the first storage area by a second computer through a network, configuring the first computer system to boot into an alternate operating system environment by the second computer system, and restoring the backup image to the first partition while the first computer system is operating within the alternate operating system environment by the second computer system.

DETAILED DESCRIPTION

Figure 1:
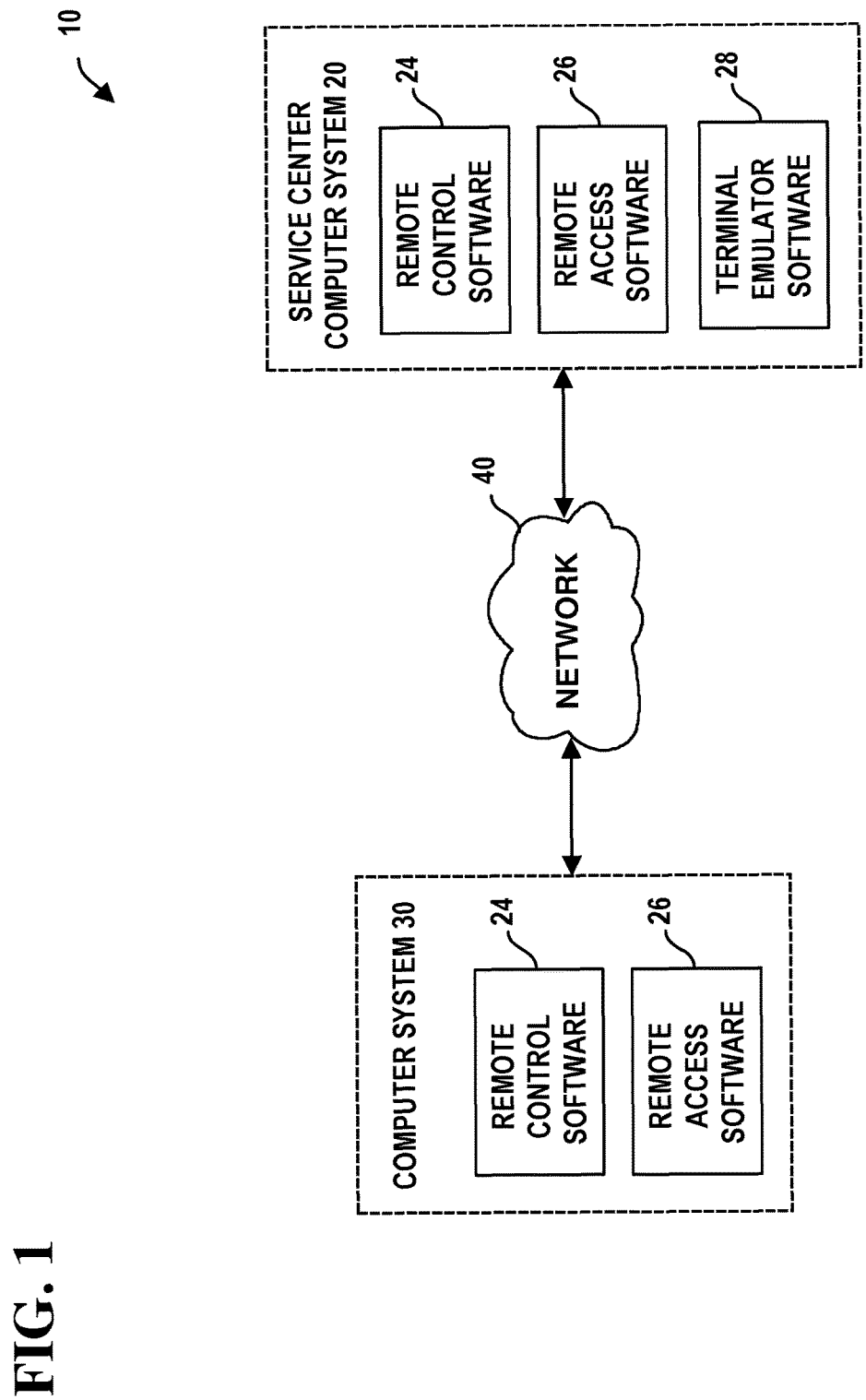
FIG. 1 is a block diagram of an example service network.

Turning now to FIG. 1, example service network 10 includes service center computer system 20 and one or more computer systems 30 connected by network 40, which may include any combination of wireless or wired networks, including local area, wide area, virtual private, and global communication networks, such as the Internet.

Computer systems 20 and 30 each include one or more processors, memory, and program and data storage. Computer systems 20 and 30 may execute an operating system such as a Microsoft operating system. Computer systems 20 and 30 may execute other computer software, which may be stored in a computer readable medium. Computer systems 20 and 30 further include wired and/or wireless network circuitry for connecting to each other through network 40, and includes other circuitry for connecting to peripherals. Computer systems 20 and 30 may include peripherals, such as a display, keyboard, mouse, touch screen, and/or other peripherals necessary to their purpose.

For example, computer system 30 may include a self-service terminal, such as an automated teller machine (ATM).

Service center computer system 20 monitors operation of computer systems 30 over network 40. Service center computer system 20 receives operational status information from components within computer systems 30, determines from the status information whether problems have occurred, and predicts from the status information whether problems are likely to occur. When problems have occurred or are likely to occur, a help desk attendant may dispatch a service technician to correct the problems on site.

Alternatively, the help desk attendant may attempt to correct the problems remotely. For this purpose, service center computer system 20 executes remote control software 24 and remote access software 26, which each include components on both computer systems 20 and 30 to allow an operator to take corrective actions.

Remote control software 24 changes settings, such as boot settings of computer system 20. An example of remote control software 24 may include Intel Active Management Technology (AMT) software for Intel vPro processors, such as the Intel vPro Platform Solution Manager software. Intel vPro processors may be controlled "out-of-band", i.e., controlled regardless of whether associated computers are on or off, or regardless of whether the primary (default boot) operating system is working or has failed or regardless of whether a storage drive is present. Intel AMT software may be stored within computer system 30 as a Basic Input Output System (BIOS) extension.

In one example embodiment, a remote help desk attendant may use Intel AMT software to initiate a scripted reboot, a backup and/or a restore of computer system 30 using software utilities that are not dependent on the primary operating system when computer system 30 is otherwise unreachable because the operating system partition has become corrupted (unbootable) or which requires a system restore (bootable, but malfunctioning). Intel AMT software includes features such as Integrated Drive Electronics redirection (IDEr) and Serial over Local Area Network (SOL) connections.

IDEr facilitates selection of a boot device different than the default boot device stored in the BIOS of computer system 30, such as bootable image files, which may include "Live" CD-Rom (LiveCD) files in International Organization for Standardization (ISO) or other image file formats. A bootable image file typically includes an operating system environment, such as a Windows Pre-Installation (PE) operating system environment, and may additionally include software tools, such as diagnostic software and drive management software, such as partitioning tools (e.g., Microsoft DiskPart software), bootable image file creation tools (i.e., Microsoft Operating System CD-ROM Image (OSCDIMG) software, and drive backup and restore software tools (e.g., Microsoft ImageX software).

Intel SOL facilitates remote connections to Intel vPro processors that have AMT technology enabled. Intel SOL establishes a virtual serial port that looks real to the operating system. The serial port can be accessed and used over the network using an Internet Protocol (IP) connection. Computer system 20 may execute terminal emulator software, such as Telnet and/or Secure Shell (SSH) software, to access and view data on the serial port. An example software program is PuTTY.

Remote access software 26 allows a service technician to remotely use computer system 20. Remote access software 26 relies on a working operating system to establish a remote connection with computer system 30. Thus, a help desk attendant may use remote access software 26 when computer system 30 has booted up normally or when computer system 30 has booted into an operating system environment of a boot image file. Example remote access software 26 may include VNC remote access software, which includes a server portion that may run as a service on computer system 30 and a client portion that runs on computer system 20.

For added security, computer system 30 may execute a script that generates and pre-configures remote access software 26 at computer system 30 with credentials, e.g., a user name and/or password. The script further sends the credentials to computer system 20 over the remote connection for the help desk attendant to use when the help desk attendant wants to use remote access software 26. The help desk attendant may view the credentials using terminal emulator software 28.

The help desk attendant may regularly use remote control software 24 and remote access software 26 to create and store recent state backup images or "snapshots" of the operating system partition or the entire contents of a storage drive of computer system 30. Alternatively or in addition, computer system 30 may be configured to automatically create snapshots on a regular basis and/or upon certain events, such as after a software patch, update, or other system change event without remote intervention.

Storing snapshots in a backup partition for later recovery when the storage drive fails, will not boot correctly, and/or when problems occur with the operating system that cannot be readily fixed, is counter to conventional wisdom which says that recent state backup images are protection against storage drive failure and should be stored on different storage drives or storage media than the storage drive being backed up. However, evidence derived from support calls suggests that a hardware failure is much less likely than a file system corruption or other software anomaly.

Figure 2:
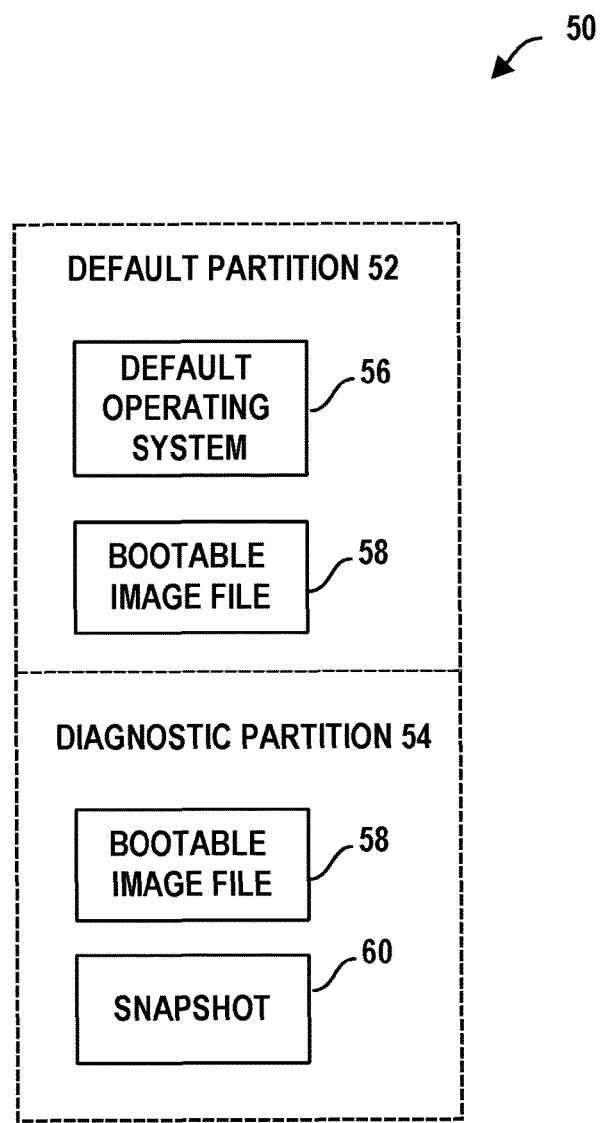
FIG. 2 is a block diagram of an example storage drive.

With reference to FIG. 2, an example storage drive 50 of computer system 30 includes two primary partitions, a default partition 52 and a diagnostic partition 54. Default partition 52 is the default or active boot partition and contains default operating system 56. Diagnostic partition 54 contains bootable image file 58, which contains an operating system environment, such as a Windows PE. Diagnostic partition 54 also contains snapshot 60.

Storage drives may be configured to include diagnostic partition 54 during assembly of computer system 30. For storage drives 50 that have not been previously configured, the help desk attendant may use remote control software 24 and remote access software 26 to do a one-time configuration of computer system 30 after it has been deployed, to prepare computer system 30 for storing snapshots.

One-Time Configuration

The help desk attendant connects to computer system 30 to configure computer 30 to store snapshots 60 while computer system 30 is operating normally. In an example embodiment, the help desk attendant may first establish a remote connection using remote control software 24 and reboot computer system 30 from a bootable image file 58 within default partition 52. If remote access software 26 requires secure credentials, the help desk attendant may view the credentials during boot using terminal emulator software 28.

Using remote access software 26, the help desk attendant performs drive management tasks using drive management software to create diagnostic partition 54. The help desk attendant may use disk partitioning tools within the operating environment of bootable image file 58, such as Microsoft DiskPart, to create diagnostic partition 54. During partitioning, drive management software may shrink default partition 52 to create room for diagnostic partition 54.

The help desk attendant may use bootable image file creation software, such as Microsoft OSCDIMG, to create bootable image file 58 in newly created diagnostic partition 54. Alternatively, the help desk attendant may copy bootable image file 58 from default partition 52 to diagnostic partition 54.

Scripting

Drive management and other tasks may be scripted. For example, a command or "batch" script may execute automatically during booting from bootable image file 58.

The script may determine whether diagnostic partition 54 already exists, and if not, display a prompt to a help desk attendant to create diagnostic partition 54, or take some other action, such as rebooting. The prompt is visible to the help desk attendant after the help desk attendant establishes a remote connection to computer system 30 using remote access software 26.

If the help desk attendant selects the option to create diagnostic partition 54, the script may automatically execute the partitioning software to create diagnostic partition 54. The script may then copy bootable image file 58 from default partition 52, or execute bootable image file creation software to create bootable image file 58 in newly created diagnostic partition 54.

The script may further display another prompt to a help desk attendant to create a snapshot 60 or to restore a snapshot 60. The prompt may include additional options, such as exit and reboot.

If the help desk attendant selects the option to create a snapshot 60, the script further executes backup software to create snapshot 60 in diagnostic partition 54.

If the help desk attendant selects the option to restore a snapshot 60, the script further executes restore software to restore snapshot 60 to default partition 52.

If either backup or restore tasks are completed in an alternate operating system environment, the help desk attendant stops IDEr to allow computer system 30 to boot from default partition 52, and then selects either exit or reboot.

Troubleshooting and Repair

When computer system 30 experiences problems, a help desk attendant may initially try to reboot computer system 30 to correct the problems. In the example embodiment, the help desk attendant may use remote control software 24 to create a remote connection to computer system 30 and to reboot computer system 30.

The help desk attendant may also try to perform diagnostics functions. The help desk attendant establishes a remote connection using remote control software 24 and reboots computer system 30 from bootable image file 58 within diagnostic partition 54. After computer system 30 reboots, the help desk attendant executes remote access software 26 and performs the diagnostic functions, which may include executing diagnostic software within the alternate operating system environment of bootable image file 58.

Though, in most cases, the quickest and easiest way to get computer system 30 running normally would be to restore default partition 52 to a previous state. To accomplish this, the help desk attendant restores a snapshot 60 from diagnostic partition 54 to default partition 52 using drive backup and restore software tools. After restoring snapshot 60, the help desk attendant stops IDEr to allow computer system 30 to boot from default partition 52.

After computer system 30 reboots, the help desk attendant may verify that computer system 30 is operating normally after being restored to an earlier state by checking operating data feeds from computer system 30.

Figure 3:
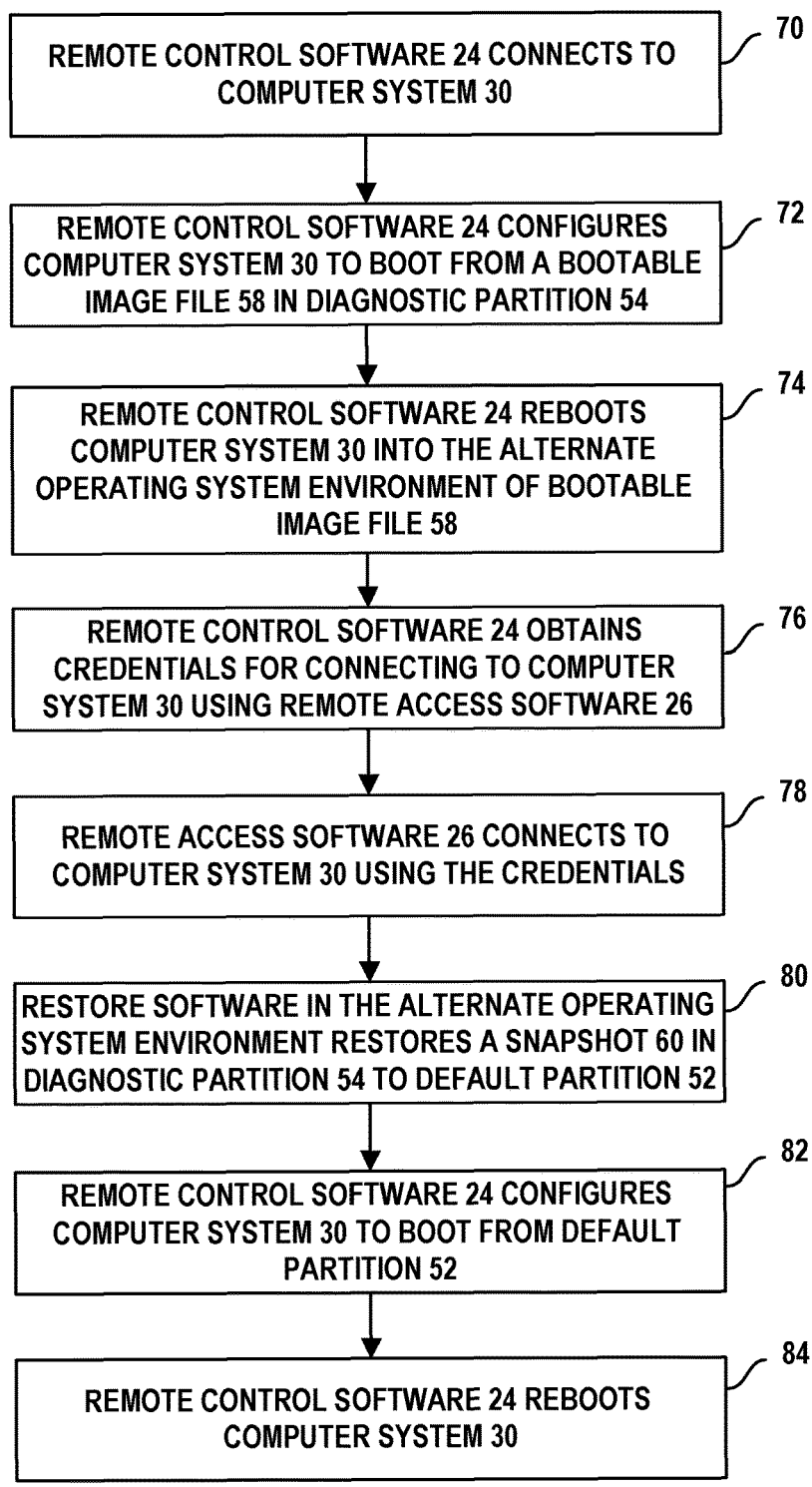
FIG. 3 is a flow diagram illustrating an example computer system recovery method.

With reference to FIG. 3, an example computer system recovery method is illustrated.

In step 70, remote control software 24 connects to computer system 30.

In step 72, remote control software 24 configures computer system 30 to boot from a bootable image file 58 in diagnostic partition 54.

In step 74, remote control software 24 reboots computer system 30 into the alternate operating system environment of bootable image file 58.

In step 76, remote control software 24 obtains credentials for connecting to computer system 30 using remote access software 26.

In step 78, remote access software 26 connects to computer system 30 using the credentials.

In step 80, restore software in the alternate operating system environment restores a snapshot 60 in diagnostic partition 54 to default partition 52.

In step 82, remote control software 24 configures computer system 30 to boot from default partition 52.

In step 84, remote control software 24 reboots computer system 30.

Computer system 20 may then receive normal operating data feeds from computer system 30.

Advantageously, after detecting that computer system 30 is unreachable through conventional means, the quickest line of recovery is a (relatively) short reboot and recovery operation which restores the latest snapshot from diagnostic partition 54 to default partition 52, and then reboots computer system 30 from default partition 52, obviating the need for a field technician to visit computer system 30 on site. Storing snapshot 60 locally in diagnostic partition 54 also obviates the need to push snapshot 60 to computer system 30 across network 40, which in many cases is not feasible due to network bandwidth or local network storage limitations.

Although the present invention has been described with particular reference to certain preferred embodiments thereof, variations and modifications of the present invention can be effected within the spirit and scope of the following claims.

What is claimed is:

1. A computer system recovery method comprising:
receiving a user identifier and password as credentials from a script that executes on a first computer system at a second computer system, wherein the user identifier and the password are sent for viewing by a user to provide the user access to remote network control software;
connecting to the first computer system including a first storage area with a default operating system environment and a second storage area containing diagnostic partition including an alternative operating system, the remote network control software, and a backup image of the first storage area by the second computer through a remote network connection using the user identifier and the password provided by the user;
configuring the first computer system through the remote network control software to boot into the alternate operating system environment by the second computer system over the remote network connection; and
restoring the backup image to the first storage area while the first computer system is operating within the alternate operating system environment and being controlled by the second computer system over a remote Internet Protocol (IP) connection through the remote network control software over the remote network connection.

2. The method of claim 1, wherein connecting comprises connecting to the first computer system through an out of band connection by the second computer system.

3. The method of claim 1, wherein connecting comprises connecting to the first computer system through a Serial over Local Area Network (SOL) connection by the second computer system.

4. The method of claim 1, wherein configuring comprises using Integrated Drive Electronics redirection (IDEr) to boot into the alternate operating system environment instead of the default operating system environment.

5. The method of claim 1, wherein configuring comprises configuring the first computer system to boot from an image file containing the alternate operating system environment.

6. The method of claim 5, wherein the image file is located in the second storage area.

7. The method of claim 1, wherein restoring comprises:
remotely accessing the alternate operating system environment of the first computer system by the second computer system; and
executing restore software within the alternate operating environment by the second computer system.

8. The method of claim 1, further comprising:
configuring the first computer system to boot into the default operating system environment by the second computer system.

* * * * *